United States Patent [19]
Stokes

[11] Patent Number: 5,903,720
[45] Date of Patent: May 11, 1999

[54] OBJECT SYSTEM CAPABLE OF USING DIFFERENT OBJECT AUTHORIZATION SYSTEMS

[75] Inventor: Randall Kay Stokes, Provo, Utah

[73] Assignee: Novell, Inc., Provo, Utah

[21] Appl. No.: 08/766,686

[22] Filed: Dec. 13, 1996

[51] Int. Cl.[6] .................................................. G06F 11/00
[52] U.S. Cl. .............................................. 395/186; 707/9
[58] Field of Search .............................. 395/186, 188.01, 395/187.01; 707/9

[56] References Cited

U.S. PATENT DOCUMENTS

| | | | |
|---|---|---|---|
| 5,261,102 | 11/1993 | Hoffman | 395/186 |
| 5,263,157 | 11/1993 | Janis | 395/600 |
| 5,276,901 | 1/1994 | Howell et al. | 395/800 |
| 5,305,456 | 4/1994 | Boitana | 395/186 |
| 5,414,844 | 5/1995 | Wang | 395/186 |
| 5,432,924 | 7/1995 | D'Souza et al. | 395/500 |
| 5,463,774 | 10/1995 | Jenness | 395/600 |
| 5,504,892 | 4/1996 | Atsatt et al. | 395/600 |
| 5,568,639 | 10/1996 | Wilcox et al. | 395/600 |
| 5,655,077 | 8/1997 | Jones et al. | 395/187.01 |
| 5,677,851 | 10/1997 | Kingdon et al. | 364/514 |
| 5,689,638 | 11/1997 | Sadovsky | 395/186 |
| 5,758,344 | 5/1998 | Prasad et al. | 707/10 |

OTHER PUBLICATIONS

Sun Microsystems Laboratories Technical Report Series, Extensible File Systems in Spring Yousef Khalidi et al., Sep. 1993.

The Essential Distributed Objects Survival Guide, Ch. 2, From Distributed Objects to Smart Components pp. 21–28, Robert Orfali et al., 1996.

Design Patterns, Elements of Resuable Object–Oriented Software, pp. 11–18, Erich Gamma et al., 1995.

In–Depth NetWare NFS Services 2.1: New Features, Novell, Inc., Dec. 1996.

Sun Microsystems, Evolving the Vnode Interface, David S.H. Rosenthal, 1990.

Primary Examiner—Albert DeCady
Assistant Examiner—Scott T. Baderman
Attorney, Agent, or Firm—Dinsmore & Shohl LLP

[57] ABSTRACT

A method and object system operative to interface with a plurality of different authorization systems. The object system provided determines the appropriate authorization system used for a particular object access request and communicates the object access request to the object authorization system. The authorization information is maintained by and interpreted by the authorization system and is opaque to the object system.

20 Claims, 9 Drawing Sheets

OBJECT SYSTEM CAPABLE OF USING DIFFERENT OBJECT AUTHORIZATION SYSTEMS

TECHNICAL FIELD

The present invention relates generally to object systems, and more particularly to an object system which is capable of interacting with a plurality of different object authorization systems.

BACKGROUND OF THE INVENTION

In general, a computer operating system controls the processing of tasks, the allocation of system memory among the tasks, the input/output to peripheral devices, and other system-level functions. A file system controls the formatting of data, maintaining the location of the data on persistent storage devices, the logical hierarchy of files, who is permitted to access what file, and other file-related tasks. File systems are frequently integral with the operating system such that although a logical distinction between the functionality of the two systems can be made, the two systems are in fact intertwined with one another from a source code standpoint. Such an integral system makes modifying either the operating system or the file system difficult because modifications to either of the systems may unintentionally impact the other system. Consequently, extending the functionality of a file system which is integral with the operating system can be difficult to accomplish.

In an attempt to overcome this problem, some operating systems have been developed which have been modularized to the extent that they can, with relatively little modification, interact with different file systems. This has enabled third party developers to provide different file systems for use with such operating systems.

One responsibility of a file system is to ensure that a resource owned by one user, such as a file, can not be wrongfully accessed by another user. Conventional file systems have a particular authorization scheme for files created by the file system. The authorization scheme includes the actual format of the authorization information as well the methods for adding, deleting and otherwise manipulating the information in the authorization structure. In conventional file systems, the routines for carrying out file authorization functionality are integral with the file system itself, much the same way that certain file systems are integral with the operating system. Thus, a particular file system provides a single authorization scheme for any file created and maintained by the respective file system. A single authorization scheme can be very limiting, as some files may contain highly sensitive data which may warrant a complex authorization scheme to ensure access is appropriately controlled, while other files may contain only slightly sensitive data which could be controlled via a much simpler authorization scheme. Changing, modifying or enhancing the authorization scheme of a conventional file system requires a new release from the vendor of the file system, who may have no desire to implement user-desired changes, or who may not be able to implement a desired change in a timely manner.

Associated with an authorization system is a mechanism for administering the authorization information associated with a particular file, such as granting or denying particular users access to the file. Such administration is typically carried out through an administration utility associated with the particular file system. Authorization schemes can differ greatly among vendors of file systems, such as an inherited rights authorization scheme compared to an explicit rights authorization scheme, and can require a significant amount of training time to be proficient at maintaining the authorization rights associated with a particular file system.

In today's environment, it is not unusual for a computer installation to have a variety of computers, which run completely different operating systems, such as Unix, NetWare®, and Windows NT, for example. Security administrators frequently find it necessary to become proficient in the file authorization utilities associated with each operating system, resulting in significant training time and expense.

One approach taken to reduce this problem has been to develop a 'front-end' to an existing file system which translates requests from one authorization scheme into the requests expected by another authorization scheme. This added layer of processing results in a less efficient authorization system, and requires extra processing time to process an authorization system request. Further, front-ends have limited success at translating an authorization request from one system into an authorization request expected by another system because of the extensive differences between the underlying structure of the authorization information of the two different systems.

It is apparent that a file system which is capable of interacting with any of a plurality of different authorization systems, which does not require vendor-implemented changes to change an authorization system, which allows different authorization schemes to be applied to different files in the same file system, and which can invoke the appropriate authorization system associated with a file access request would eliminate many of the problems encountered with conventional file systems.

SUMMARY OF THE INVENTION

It is one object of this invention to provide a method and object system capable of interacting with a plurality of different authorization systems.

It is another object of this invention to provide a method and object system which is independent of and has no knowledge of the internal authorization structure associated with an object maintained by the object system.

It is yet another object of this invention to provide a method and object system which is capable of allowing the registration of a plurality of different authorization systems, which can associate a particular authorization system with an object at object creation time, and which can interact with the particular authorization system to allow the authorization system to determine how authorization rights will be determined for the particular object.

It is still another object of this invention to provide a method and object system capable of interacting with a plurality of different authorization systems, each authorization system capable of maintaining the authorization information associated with an object in a format unique to the particular authorization system.

It is still another object of this invention to provide a method and object system which is capable of interacting with an authorization system which can maintain authorization information in a particular authorization structure, and yet can offer different 'appearances' of the authorization structure to authorization system administration utilities.

Additional objects, advantages and other novel features of the invention will be set forth in part in the description that follows, and in part, will become apparent to those skilled in the art upon examination of the invention. The objects and the advantages of the invention may be realized and obtained by means of the instrumentalities and combinations particularly pointed out in the appended claims.

To achieve the foregoing and other objects in accordance with the purposes of the present invention as described above, a method and object system capable of interacting with a plurality of different object authorization systems is provided. According to one embodiment of this invention, the object system includes a predetermined authorization system interface which is capable of interacting with one or more authorization systems having the same predetermined authorization interface. Each authorization system registers its availability with the object system. The object system maintains an authorization system table, with each entry of the table having a reference to an authorization system structure which is associated with a registered authorization system. According to one embodiment of this invention, authorization systems are registered for use with a particular volume. A persistent storage device can have multiple volumes defined, and a single volume can comprise several persistent storage devices. All objects associated with a particular volume are maintained by the same authorization system. Each volume can be implemented in the system as an object, and one attribute of the volume object is a reference to the authorization system for use with any object owned by that particular volume. When a request is made to the object system to create an object, the object system determines with which volume the object is to be associated and via the authorization system reference in the volume object can interact with the particular authorization system to maintain authorization information for the new object.

Because the object system and the authorization system have a predetermined interface, such as a plurality of authorization functions with predetermined parameters, the object system can pass authorization related requests to the particular authorization system associated with an object, and need not be aware of how the authorization system carries out its authorization functionality, and need not know the format of the authorization structure associated with the object. The object system need only send object authorization requests to the authorization system associated with the object, and return the status of the request to the originator.

One mechanism for implementing such a modular object system is through the use of a language which allows indirect invocation of functions, or routines, through function pointers. At registration time, an authorization system can provide to the object system pointers to the functions provided by the authorization system, allowing the functions to be invoked by the object system as needed to provide authorization system functionality. The function pointers can be maintained by the object system, or operating system, in structures which are indexed by an identifier associated with each authorization system. In this manner, an authorization system can be developed and integrated into an existing object system without any interaction with the developer of the object system.

According to another embodiment of this invention, the object system is capable of interacting with an authorization system which provides an authorization model and one or more authorization spaces. The authorization model defines the layout of the authorization structure of the authorization information for each object which is maintained by the respective authorization system. The authorization model is responsible for interfacing with the object system and providing creation, deletion, packing, and unpacking of authorization related information, and granting or denying object access requests. Each authorization space associated with an authorization system is responsible for interfacing with administration utilities responsible for maintaining the rights associated with an object. Thus, the authorization space provides the functionality for adding, deleting and otherwise modifying the authorization information, such as which users are allowed access to which objects. Each authorization space can provide a different 'look' of the authorization information to an administration utility. For example, a model which maintains authorization information in a particular format, for example a NetWare authorization structure format, can have a Unix authorization space which can interface with Unix administration utilities, allowing an individual trained in Unix administration to administer objects which inherently have a NetWare authorization structure. The underlying structure of the authorization information will be transparent to the Unix administrator who, through the use of a Unix space, will observe the information as if it were stored in a Unix-like structure. Thus, an authorization space provides the ability to view authorization information stored in a given format to appear as if it were stored in an entirely different format. The advantages achieved by this invention include the independence of the object system from the authorization information associated with objects maintained by the object system, such that the object system only views the authorization structure as an opaque block of data.

The object system according to this invention also allows the same authorization space, for example a Unix authorization space, to be provided for more than one particular authorization model. Thus, an administrator using a Unix administration utility need not be concerned with the authorization model associated with a particular object, or that different objects can have entirely different underlying authorization structures. The authorization space can include a director portion which receives the object access request from the administration utility, and directs the request to the specific authorization space developed for the authorization model associated with the object.

Still other objects of the present invention will become apparent to those skilled in this art from the following description, wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative and not as restrictive.

BRIEF DESCRIPTION OF THE DRAWINGS

The accompanying drawings incorporated in and forming a part of this specification, illustrate several aspects of the present invention, and together with the description served to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF PREFERRED EMBODIMENTS

Figure 1:
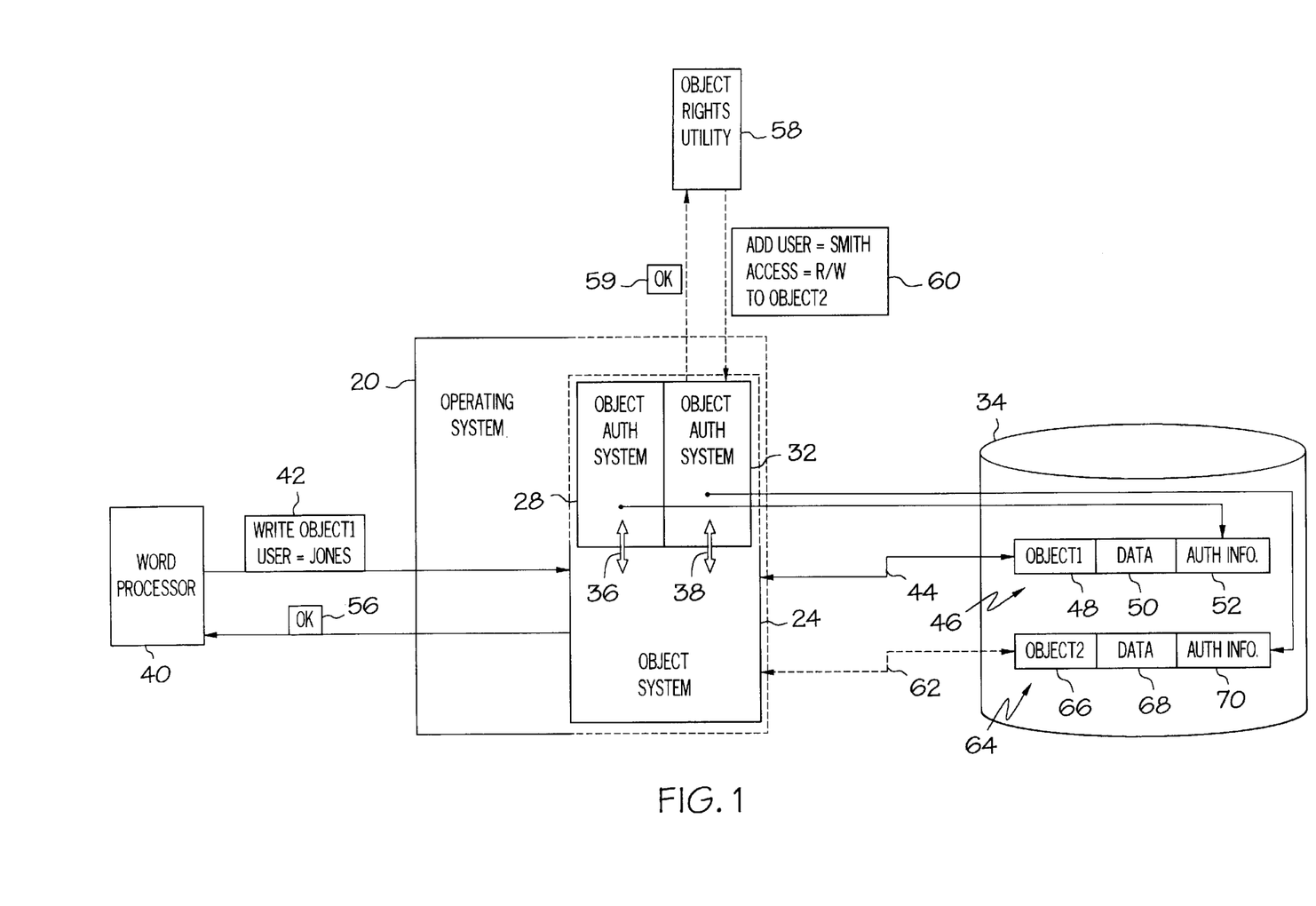
FIG. 1 is a block diagram illustrating an object system according to one embodiment of this invention.

Referring now to the drawings, FIG. 1 shows an object system according to one embodiment of this invention. The phrase object is used throughout this disclosure to indicate the applicability of the invention disclosed herein to any entities which can be perceived or implemented as objects, including conventional files. For ease of understanding, one can consider the phrase object system to refer to a file system, and the word object as referring to a file, although as mentioned, it should be understood that the invention disclosed herein is not so limited in its applicability. The invention disclosed herein can be implemented in various ways, including as a part of an object system as is disclosed in concurrently filed U.S. patent application of Neal R. Christiansen, entitled METHOD AND SYSTEM FOR IMPLEMENTING OBJECTS IN A STORAGE SYSTEM, Ser. No. 08/766,685 which is hereby incorporated herein by reference.

Object system 24 executes in conjunction with operating system 20. The dashed lines which extend from operating system 20 about object system 24 indicate that object system 24 can interact directly with the external world, that is processes or entities other than the operating system, or can interact with the external world through an operating system 'layer', such as a particular application programming interface (API) to reduce any complexity which may be associated with object system 24. Object system 24 maintains objects 46 and 64, which are shown as existing on device 34, which can be a persistent storage device, such as a disk drive, or a memory device, such as a random access memory (RAM). Operating system 20 executes on a conventional computer and can be implemented in a stand alone or a client/server environment. Thus, word processor 40 can be executing on a client computer and interact with operating system 20 via a network (not shown) or can be executing on the same computer as operating system 20. Likewise, object rights utility 58 can be executing on a client computer coupled to the computer which is executing operating system 20 via a network, or can execute on the same computer on which operating system 20 is executing.

One function of object system 24 is to communicate object access requests to the object authorization system associated with the object to be accessed. For purposes of this description, it will be assumed that authorization information 52 of object 46 is maintained by object authorization system 28, and that authorization information 70 of object 64 is maintained by object authorization system 32. It should be understood that neither object system 24, operating system 20 nor programs 40 and 58 need to understand or be concerned with the actual structure of authorization information 52 and 70. Authorization information requests are handled by the object authorization system, such as object authorization system 28 or object authorization system 32, which includes the function of accepting object access requests, providing the functionality required, and returning a status or authorization information, as requested.

For example, word processor 40 wishes to write data to object 46. A write request includes certain information necessary to determine if the request should be granted, as illustrated by packet 42. The type of access desired, the user attempting the access and the object to be accessed is communicated to operating system 20 and object system 24. Object system 24 determines that object authorization system 28 maintains the authorization information structure of object 46, and communicates the access request via interface 36 to object authorization system 28. Object authorization system 28 accesses authorization information 52 and determines whether user Jones has write access to object 46. If authorization information 52 indicates that user Jones does have such access rights, object authorization system 28 returns an OK result to object system 24, which then writes the packet of information to data 50 of object 46 and returns the OK response 56 to word processor 40.

Authorization systems 28 and 32 maintain authorization information 52 and 70, respectively, almost completely independently of object system 24. Object system 24 merely invokes one or more functions of the authorization system associated with a particular object as certain authorization functionality is required. For example, authorization system 28 will be invoked by object system 24 when object 46 is first created in order to initialize the authorization structure associated with object 46, and to provide default authorization information 52. Authorization system 28 will also be invoked by object system 24 for other functionality such as packing or compressing authorization information 52 into any desired format in preparation for writing authorization information to a persistent storage device such as a disk drive, for unpacking authorization information 52 after it has been read from a persistent storage device into a random access memory (RAM), and for other functionality where the layout of the authorization structure is relevant to the needed operation.

Object authorization systems 28 and 32 also provide the functionality to read and write authorization information 52 and 70, respectively, as requested by administration utilities responsible for maintaining the authorization information. For example, object rights utility 58 is used to add and delete users and otherwise manipulate access rights which are maintained in authorization information 70. Although object authorization systems 28 and 32 preferably offer authorization manipulation functionality directly to administration utilities, the dashed lines of object system 24 about object authorization systems 28 and 32 indicate that object authorization systems 28 and 32 can offer functionality through a layer of object system 24 and/or operating system 20 to hide the actual interface of object authorization systems 28 and 32 from the external world. For example, assume that object rights utility 58 attempts to add user Smith with access rights of read/write to object 64, as shown in request 60. Object authorization system 32 receives this request, accesses authorization information 70, and after ensuring that the user of object rights utility 58 has such authority, adds the appropriate rights to object 64. Object authorization system 32 then returns OK response 59 to object rights utility 58.

Figure 2:
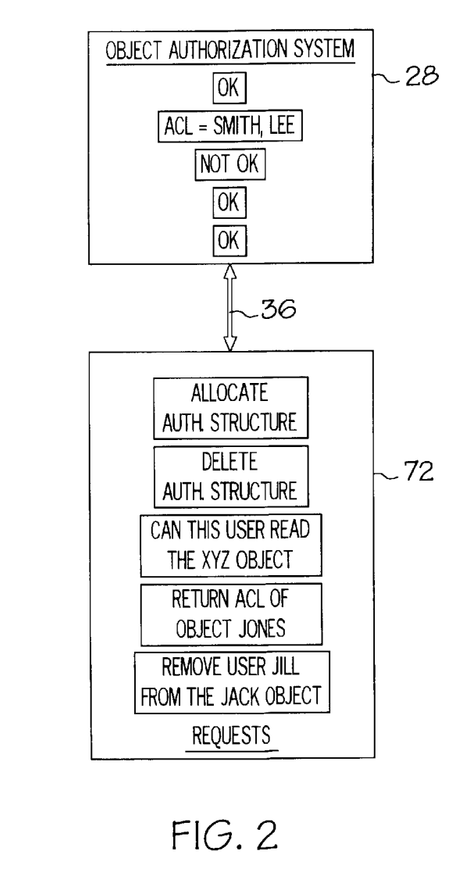
FIG. 2 is a block diagram illustrating an object system according to one embodiment of this invention interacting with an object authorization system.

FIG. 2 is a block diagram illustrating the general interaction between authorization information access requests and authorization system 28, according to one embodiment of this invention. Block 72 illustrates several of the types of requests that can be communicated to object authorization system 28 either directly from object system 24 or from the external world such as object rights utility 58. Such requests can include, for example, a request to allocate a particular authorization structure, which might occur when the object is initially created, a request to delete a particular authorization structure, which might occur when the object is being deleted. Another request might be to determine whether a particular user has read access to a particular object. Another object access request might be to return the access control list (ACL) of a particular object. Still another type of object access request might be to remove from an object access rights previously granted to a particular user. Object authorization system 28 receives these requests, acts upon the requests and returns appropriate responses to the requester.

Figure 3:
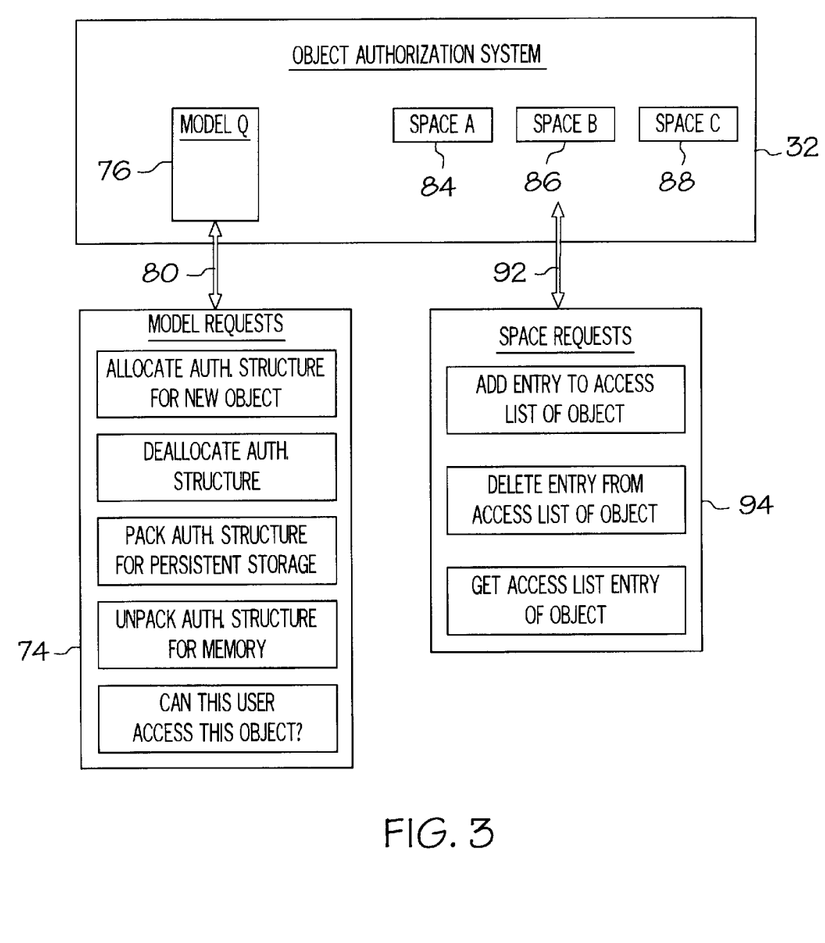
FIG. 3 is a block diagram illustrating an object system according to another embodiment of this invention interacting with an object authorization system.

FIG. 3 shows a block diagram illustrating the interaction between object system 24 and authorization system 32 according to another embodiment of this invention. Object authorization system 32 provides predetermined interfaces 80 and 92 to communicate with object system 24 and the external world, respectively. Authorization system 32 comprises model 76 and authorization spaces 84, 86 and 88. Among the responsibilities of model 76 are defining a layout of an authorization structure for a particular object, for allocating and deallocating the structure upon request from object system 24, and for granting or rejecting a request to access an object. Model 76 can be associated with a plurality of different objects. One mechanism for associating model 76 with particular objects is via associating each object in the system with a particular parent object, commonly referred to as a volume object, and associating the volume object with a particular authorization system. A volume according to this invention is a logical construct and can comprise any grouping of objects, and is not limited to a particular hardware configuration. In this manner, the authorization structure associated with each object owned by a particular volume will be defined by the particular model associated with that volume.

An authorization space, such as authorization spaces 84, 86 and 88, primarily provide interaction between the authorization information defined by a particular authorization model, and external requests to maintain the authorization information within a particular object's authorization structure. Such external requests primarily originate from authorization information administration utilities for adding, deleting, and otherwise manipulating authorization information in an authorization structure. Each authorization space associated with model 76 can provide a different 'appearance' of the authorization information to the external world, while operating against the same physical authorization structure defined by model 76. For example, space 84 may provide a Unix 'appearance' to an external Unix administration utility. Space 86 can provide a NetWare 'appearance' to an external NetWare administration utility. Likewise, space 88 can provide an external Z 'appearance' a Z-administration utility. Although three spaces have been provided for model 76, any number of spaces can be provided for a particular model. One of the advantages achieved by this invention is the disassociation of the actual underlying authorization structure from the way the authorization information is presented to the external world, allowing administrators having training and skills in one particular authorization information scheme to maintain the authorization information associated with an object having an underlying structure completely different from the authorization scheme in which the administrator was trained. Thus, a space can provide a way for people with NetWare administration utility expertise to administer an object having a Unix authorization structure without having to undergo Unix administration training.

Another advantage achieved by the present invention is that an object authorization system can be implemented, or 'plugged in', to the corresponding object system at any time. If a stronger authorization scheme is needed for objects containing highly sensitive data, an authorization system can be developed and implemented without requiring the vendor of the object system to modify, test and debug the object system before the new authorization scheme can be implemented.

Authorization Models

Model 76, as discussed above, is primarily responsible for creating, deleting and otherwise maintaining the structure of the authorization information, as well as determining whether a particular user has access to a particular object. This functionality loosely correlates to the functionality typically provided by a file system with respect to the authorization for a file. Object system 24 according to this invention has a predetermined interface such that any authorization model offering the same predetermined interface can interact with object system 24 and can create and otherwise maintain authorization structures for objects using the respective authorization model. A registration process, as discussed in more detail below, is one mechanism for identifying a particular authorization model to object system 24. It is apparent that the interface between object system 24 and authorization model 76 can vary depending upon system design and desired functionality. That is, the number, the types and the particular functionality provided by an authorization model can differ across implementations. According to one embodiment of this invention, the interface between object system 24 and authorization 76 model comprises authorization model 76 offering the following functions and functionality shown in Table 1, below.

TABLE 1

| struct AuthModelOps_s ZASAuthorizeModelOps = |
|---|
| {<br>    ConstructAuthObject,<br>    DestructAuthObject,<br>    PackedSize,<br>    PackAuthObject,<br>    UnpackAuthObject,<br>    InsertAuthObject,<br>    RemoveAuthObject,<br>    MayIDoThis<br>}; |

The ConstructAuthObject function is invoked by object system 24 when a new object is initially created, and is responsible for allocating the initial authorization structure.

The DestructAuthObject function is called by object system 24 when the object is freed from memory, and deallocates the memory allocated to the authorization structure.

The PackedSize function is called by object system 24 when the object is written to persistent storage, such as a disk drive, and returns the packed size of the authorization structure to object system 24.

The PackAuthObject is called by object system 24 to allow the authorization system to convert the structure of the authorization information from one format to another format in preparation for storing the object to a persistent storage device. For example, the PackAuthObject function can compress or otherwise change the layout of the authorization information.

The UnpackAuthObject function is called by object system 24 when the authorization structure is read from persistent storage into memory. The UnpackAuthObject function can unpack the layout of the authorization as it existed on persistent storage to a different format for memory.

The InsertAuthObject function is called by object system 24 when an object is initially created and is responsible for initially loading default authorization information into the authorization structure.

The RemoveAuthObject function is called by object system 24 when the object is deleted and is responsible for ensuring that the object name is removed from all other object's authorization structures.

The MayIDoThis function is called by object system 24 when some process requests access to a particular object. The MayIDoThis function examines the authorization information contained in the authorization structure of the particular object and either grants or rejects the request to access the object, which object system 24 then returns to the requestor The actual authorization structure or object containing the authorization information for a particular object can be maintained as a subclass of a file object, or can be a stand alone object associated with a file object.

Authorization Spaces

Object system 24 according to one embodiment of this invention allows one or more authorization spaces to be registered for use with one or more authorization models. The authorization space is responsible primarily for those functions which are necessary for adding, deleting and otherwise manipulating the authorization information maintained in the authorization structure associated with an object. By modularizing authorization information maintenance functionality, authorization spaces can provide different 'appearances' of the authorization structure to the external world, such 'appearances' being independent of the actual layout of the authorization structure which is defined by a particular authorization model. Further, an authorization space can provide the same look for different models. For example, an authorization space Z can be developed for both a model A and model B. Although each authorization space Z will in fact differ internally from each other in order to access different underlying authorization structures, each authorization space Z will provide the same external functions and provide the same look to the authorization structure defined by either model A or model B. A director can be provided which receives requests to an authorization space, and directs the request to the particular authorization space associated with the authorization model used to create the authorization structure of the object to be accessed.

For example, authorization space Z can provide a director for receiving authorization space Z requests, determining which model the object to be accessed is associated with, and invoking the appropriate authorization space Z. Such 'function binding' occurs at execution time and can be implemented, for example, with the use of function pointers. The actual number, parameters and types of functions exported by any particular authorization space can differ depending on the functionality provided, and the interface of the particular administrative utilities. For example, if a NetWare authorization space is implemented, those functions normally expected by NetWare administration utilities can be exported by the NetWare authorization space. A NetWare authorization utility can call the NetWare space director, which can transparently bind the request to the appropriate NetWare authorization space, depending on which authorization system is associated with the object to be accessed. Thus, different authorization spaces can export different functions. The sole requirement is that the functions exported by any particular authorization space, such as a NetWare authorization space, all be the same across all models so that the NetWare authorization space director can properly invoke the correct authorization space function regardless of the model to which the object to be accessed belongs. Such administration utilities can either be written to the particular authorization space director, or the authorization space director can 'hook' the administration utility function calls.

Although the precise functionality provided by the functions of any particular authorization space can differ, the following table lists authorization space functions which could be part of an authorization space according to this invention.

```
struct ZASAuthSpaceOps__s ZASAuthorizeSpaceOps =
{
    VAUTH__AddACLEntry,
    VAUTH__RemoveACLEntry,
    VAUTH__GetACLEntry,
    VAUTH__GetEffectiveRights,
    VAUTH__GetInheritedRightsMask,
    VAUTH__SetInheritedRightsMask,
};
```

The AddACLEntry function adds an access control list to a specified object. The RemoveACLEntry function removes an access control list from an object. The GetACLEntry retrieves an access control list from an object.

The GetEffectiveRights function searches through objects in an inherited rights scheme to find the access control list inherited by a particular object. The GetInheritedRightsMask function retrieves the inherited rights mask of an object. The SetInheritedRightsMask sets the inherited rights of an object.

Figure 4:
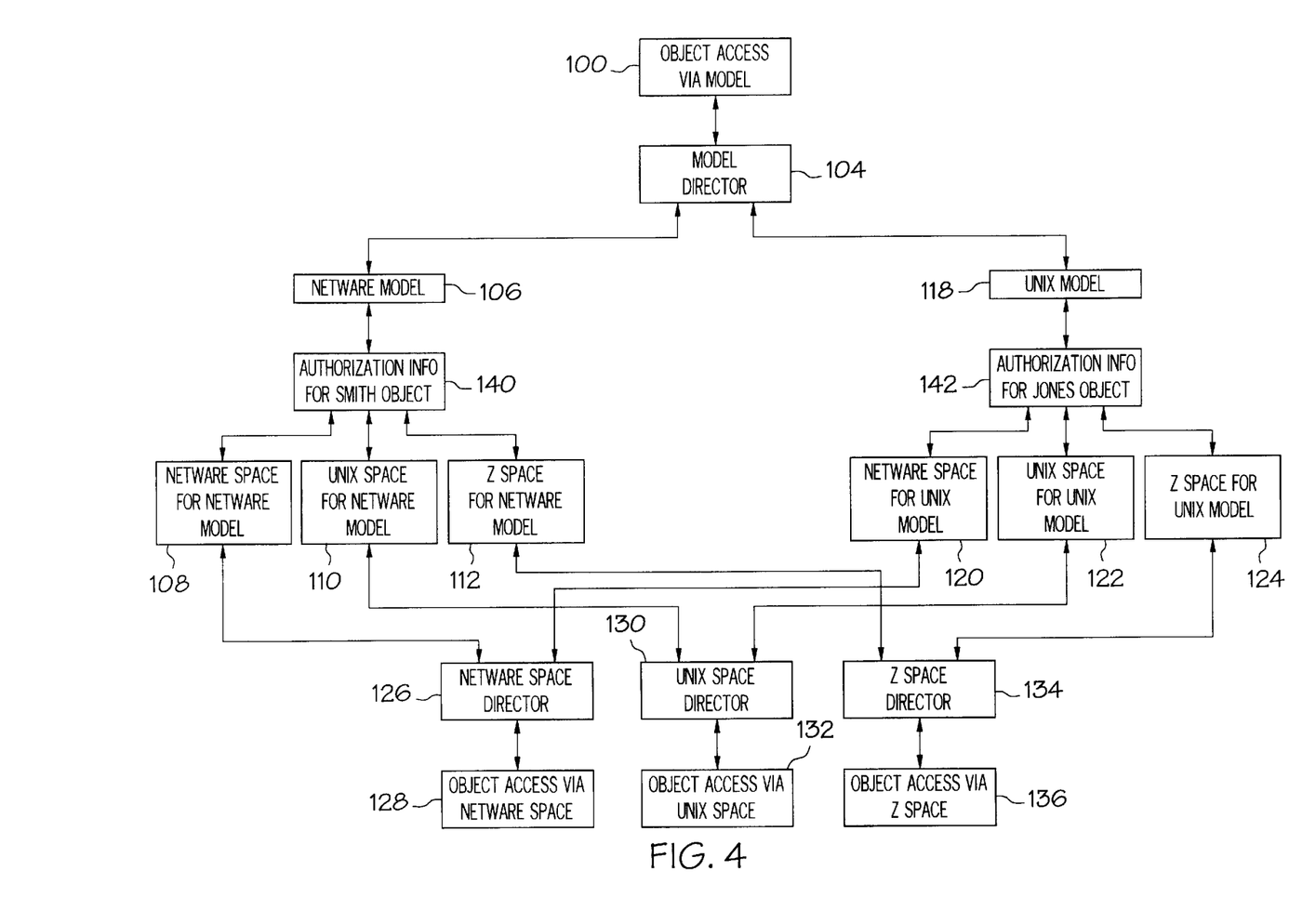
FIG. 4 is a schematic diagram illustrating various components of an object authorization system and the interaction between the object authorization system and an object system according to this invention.

FIG. 4 is a schematic diagram illustrating the use of two authorization models and three different authorization spaces. Object 140 is associated with NetWare model 106, and object 142 is associated with Unix model 118. By associated with, it is meant that at the time of creation, object 140 was associated with a volume using NetWare model 106. Thus, the authorization structure associated with object 140 is a NetWare-type authorization structure. Likewise, at the time of creation, object 142 was associated with a volume associated with Unix model 118, and thus the authorization structure associated with object 142 is a Unix-type structure. FIG. 4 shows two authorization systems, the first authorization system comprising NetWare model 106, NetWare space 108, Unix space 110 and Z space 112. The second authorization system comprises Unix model 118, NetWare space 120, Unix space 122 and Z space 124.

NetWare spaces 108 arid 120 share a common NetWare space director 126 which is responsible for receiving an object access request from the external world, illustrated by block 128, and determining which authorization model is associated with the particular object to be accessed. NetWare space director 126 then invokes the appropriate space function in either NetWare space 108 or NetWare space 120 depending upon whether the object to be accessed is associated with NetWare model 106 or Unix model 118, respectively. The mechanism for making this determination is described in more detail below. Likewise, Unix spaces 110 and 122 have Unix space director 130, and Z spaces 112 and 124 have Z space director 134, which serve the same function respectively as NetWare space director 126.

Access to the authorization structure of an object via an authorization model is similarly directed by model director 104. As discussed above, functions which access the authorization information through the authorization model are typically object system level functions such as those responsible for allocating and deallocating the authorization information structure, or determining if a particular user has access to a particular object. Thus, block 100 generally represents an object access via object system 28. Model director 104 takes the request of object system 28 and determines which model is associated with the particular object to be accessed. Model director 104 then invokes the appropriate model function in either NetWare model 106 or Unix model 118, depending upon whether the access request related to object 140 or object 142, respectively. Model director 104 can comprise any method which can accomplish run-time function binding, such as through function pointers, for example.

As illustrated in FIG. 4, one advantage achieved by the method and system of this invention is the independence of the Layout of the authorization information from both the object system and the external world. An object system can ask generic requests of the authorization system such that the object system need not be concerned with how the authorization functionality is being provided, and allows the developer of the authorization system to provide any suitable authorization structure via the authorization model, and still allow the authorization structure to appear to have any particular format via the authorization spaces.

Figure 5:
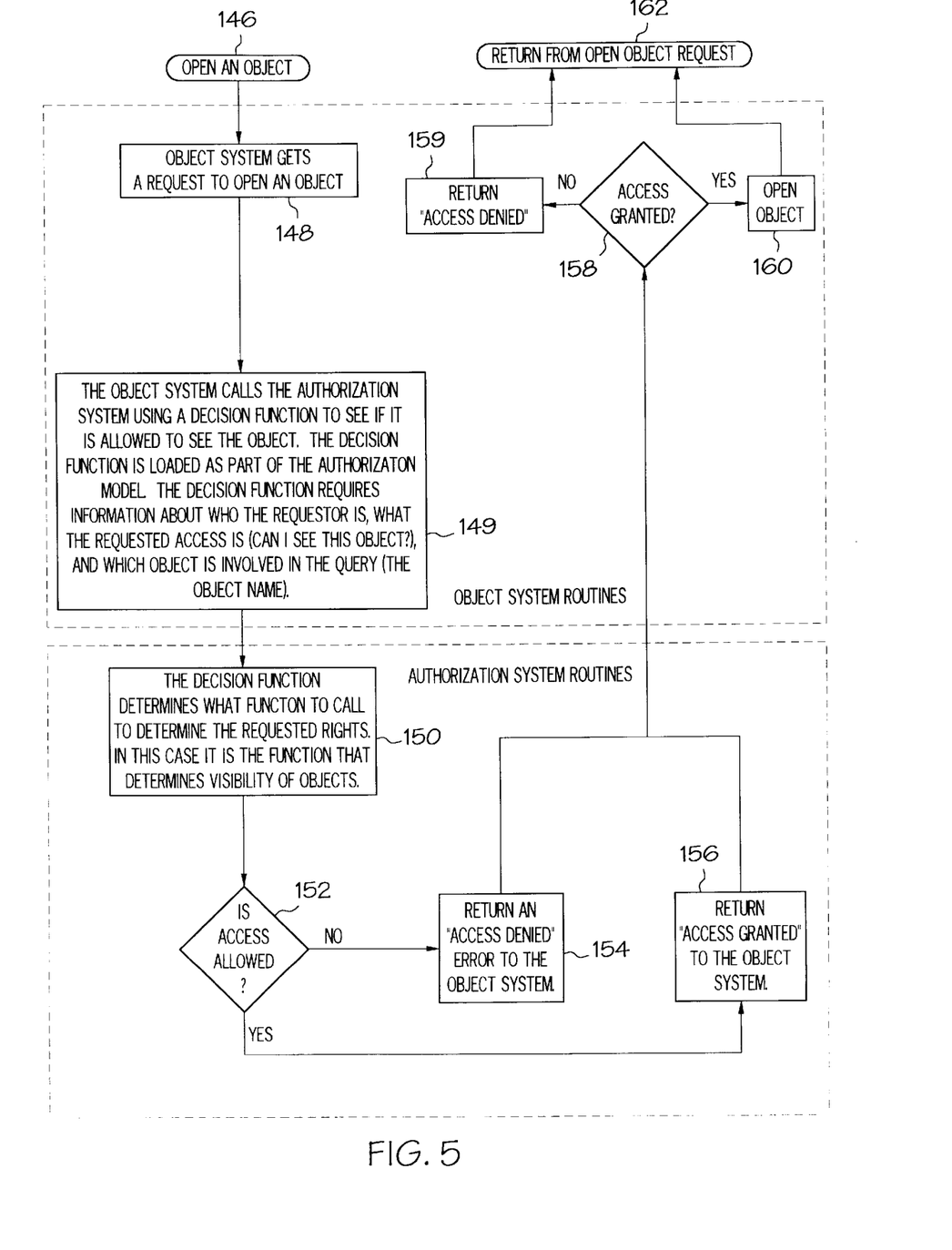
FIG. 5 is a flow diagram illustrating the interaction between an object system according to this invention and an authorization model.

FIG. 5 is flow diagram showing the general interaction between an object system and an authorization system model. At block 146 an open object request is made, for example by a program which wishes to read data associated with an object. At block 148 the object system receives the request and calls the decision function (MayIDoThis) of the authorization mode associated with the object to see if the user is allowed to open the object. The decision function of the authorization model was loaded as part of the registration process of the authorization model, as described below in more detail. The decision function accepts information about who the requester is, what the requested access is and which object is involved in the access request. The decision function illustrated in this example maintains a plurality of functions which the decision function calls depending upon the particular access requested. Such an implementation is only one way of providing such functionality, and could also be provided through other techniques, such as a case statement, for example.

At block 150, the decision function determines which access function to invoke to determine the requested access rights. At block 152 the invoked function determines whether this user is allowed to perform this access against this object. If not, at block 154, an access denied message is returned to object system 28. If such access is allowed, then at block 156 an access granted message is returned to object system 28. If the access denied message was received at block 158, then at block 159 object system 28 returns an access denied response to the user making the open object request. If access was granted, object system 28 opens the requested object at block 160, and at block 162 returns an OK response to the user making the initial request.

Figure 6:
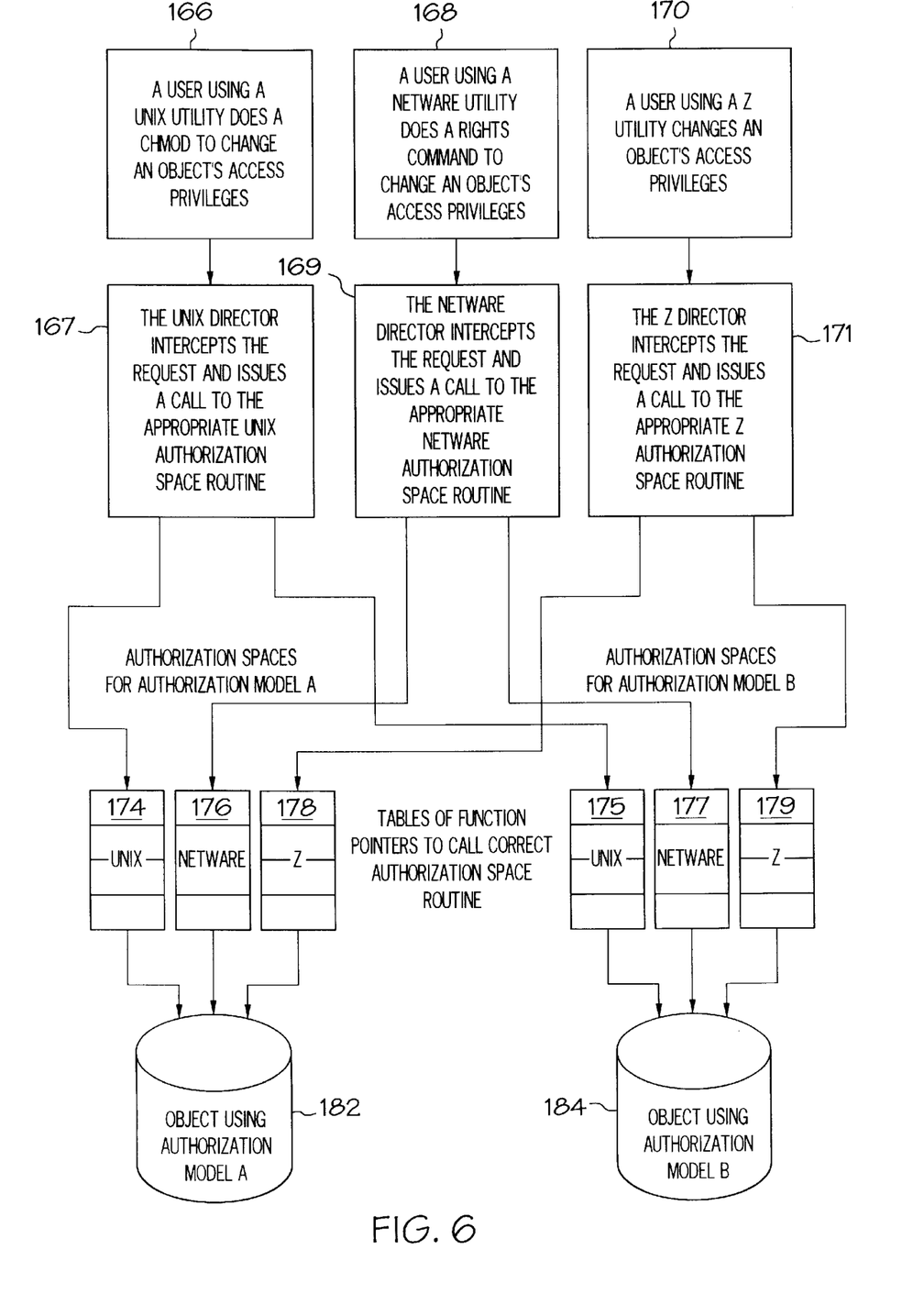
FIG. 6 is a flow diagram illustrating the interaction between a plurality of authorization spaces and authorization models and an object system according to one embodiment of this invention.

FIG. 6 is a flow diagram showing the interaction between the external world, such as an administration utility, and the authorization space routines of an authorization system. The authorization space may interact with such programs differently depending upon whether such programs existed prior to the development of the authorization space or will be developed after the development of the authorization space. For example, if the authorization space developer wishes to interact with an existing administration utility, the authorization space can 'hook' the function calls of the existing administration utility. Mechanisms for 'hooking' a function call are known to those skilled in the art, and will not be described in detail herein. For administration utilities developed after the design of the authorization space, such administration utilities write directly to the Application Programming Interface (API) offered by the authorization space.

Referring to FIG. 6, at block 166, a user using a Unix administration utility initiates a CHMOD command to change an object's access privileges. At block 167, the Unix director for Unix spaces 174 and 175 is invoked and calls the appropriate Unix authorization space routine depending upon whether the object is associated with model A or model B. This run-time function binding can be achieved, for example, by maintaining tables of function pointers for each authorization space which point to the actual functions of the particular authorization space. The vendor of the object system can export functions capable of returning the appropriate function pointers of the authorization spaces to the application space director. By determining which authorization system is associated with the object which is to be changed by the CHMOD command, the UNIX director can determine which authorization space's table of function pointers to index, and then invoke the appropriate function. The process would be similar with respect to a NetWare utility at blocks 168 and 169 and NetWare authorization spaces 176 and 177, or a Z utility at blocks 170 and 171 and Z authorization spaces 178 and 179.

Figure 7:
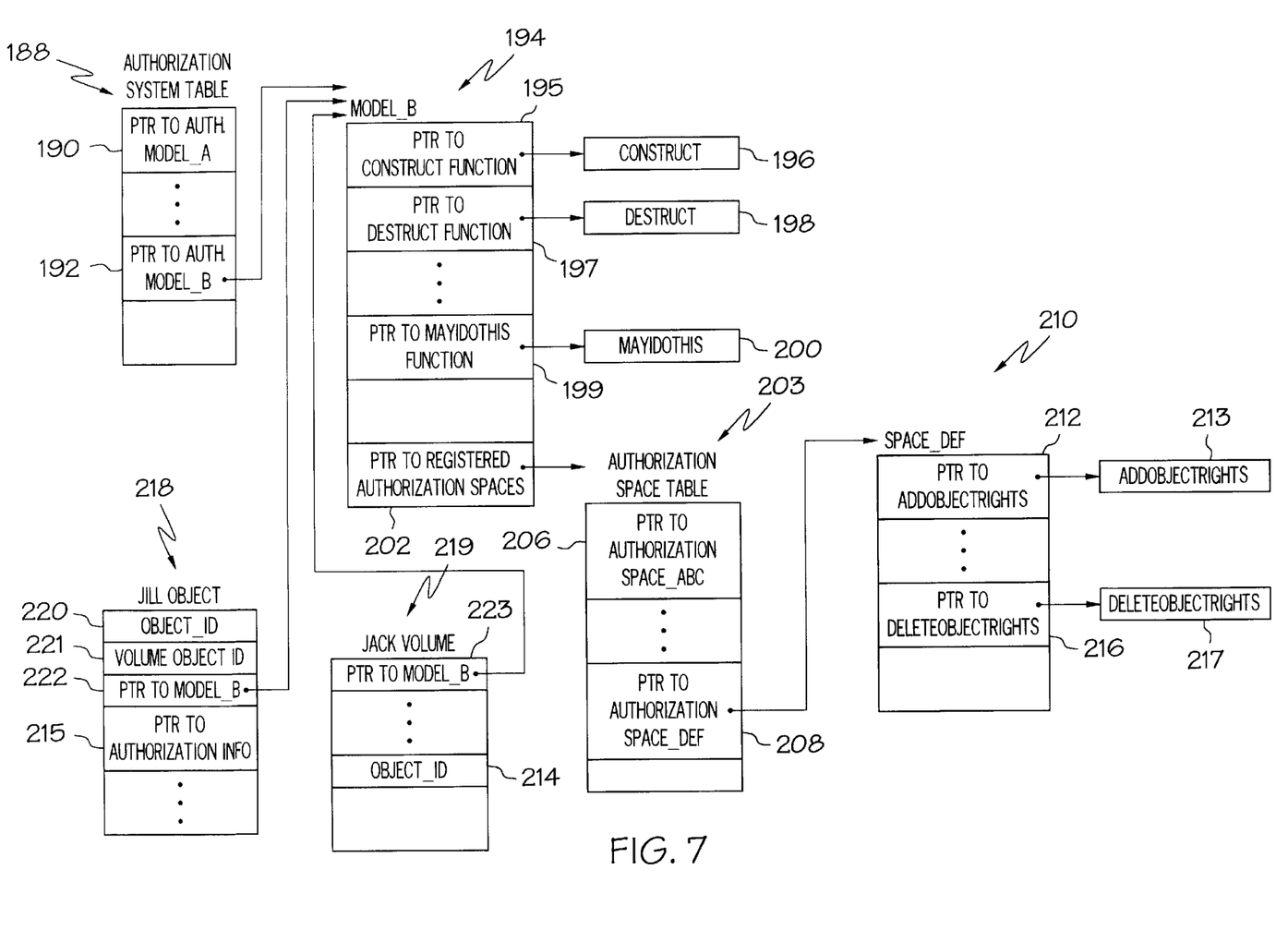
FIG. 7 is a schematic diagram illustrating an in-memory implementation of the object system according to one embodiment of this invention.

FIG. 7 is a schematic diagram illustrating the in-memory tables of function pointers which allow the various model and authorization space directors to run-time bind the appropriate authorization system function or routine with the appropriate authorization system requests. One aspect of the run-time binding is that the authorization models and the object system have a predetermined interface, which can be designated by convention or at least partially dictated by the design of the particular object system. The predetermined interface can include the authorization models offering to the object system a certain number of functions, each of which provides certain functionality and which has a certain function prototype so it can be invoked indirectly by the object system via a function pointer. For example, MayIDoThis function 200 provides the functionality of determining whether a given user has access to a given object. MayIDoThis function 200 can make this determination in any way the developer desires, but the function prototype of the MayIDoThis function is the same for the MayIDoThis functions in the various models.

Each authorization model, such as authorization model 194, is pointed to by a reference in authorization system table 188. Entries are made in authorization system table 188 during the authorization system registration process. Each authorization model includes a structure which contains pointers to the various predetermined functions associated with that particular authorization model. For example, authorization model 194 contains reference 195 which is a pointer to the actual Construct function for authorization model 194. The Construct function can exist in a separate program, such as a dynamic link library (DLL). Likewise, reference 197 is a pointer to the Destruct function for authorization model 194. Reference 199 is a reference to the MayIDoThis function associated with authorization model 194.

Thus, the model director function is achieved by determining the index into authorization system table 188 of the authorization model associated with the object to be accessed, along with the index into the model structure (194) of the function to be invoked. For example, if by convention the MayIDoThis function is the eighth entry in the model structure (194), to determine if a user has access to a particular object the model director need only determine which model is associated with the object, obtain the index into the authorization system table (188) of that particular model, and invoke the eighth entry of the model structure.

Authorization model 194 also contains reference 202 to authorization space table 203, which contains references to the various authorization spaces which have been registered for use with model 194. For example, reference 208 points to authorization space object 210. Authorization space object 210 in turn contains a plurality of references to the various functions associated with that particular space. For example, reference 212 is a reference to AddObjectRights function 213 of authorization space object 210. Reference 216 is a reference to DeleteObjectRights function 217 associated with authorization space object 210. Thus, the run-time binding of the authorization space function similarly requires only the index of the model associated with the object to be accessed, and the particular offset into authorization space object 210 of the function to be invoked.

One mechanism for associating a particular model to a particular object is to include in volume object 219 authorization system reference 223 to the model associated with volume 219, in this example model 194. At object creation time, a field in each object, such as volume objectID 221 of object 218, is included in the object which provides a reference to the volume which owns the object. Since each object access request handled by an authorization system must identify the object to be accessed, the object system can determine the volume associated with the object via volume objectID 221, and then the particular authorization system associated with that volume via authorization system reference 223. To eliminate the need to index into the volume object for each object access request, authorization system reference 223 can be copied into object 218 as authorization system reference 222.

The structures of function pointers shown in FIG. 7, such as authorization system table 188, model 194, authorization space table 203 and authorization space object 210 can be maintained by the operating system, the object system, or any other process, as long as the authorization model director and authorization space director have access to the references in the tables.

Registration Process

The pointers shown in FIG. 7 can be obtained during the registration of the respective authorization system. The registration process is implementation dependent, and thus can vary among different object systems, but one goal of the registration process is for the object system to obtain references, or pointers, from the authorization system to its authorization functions.

Figure 8:
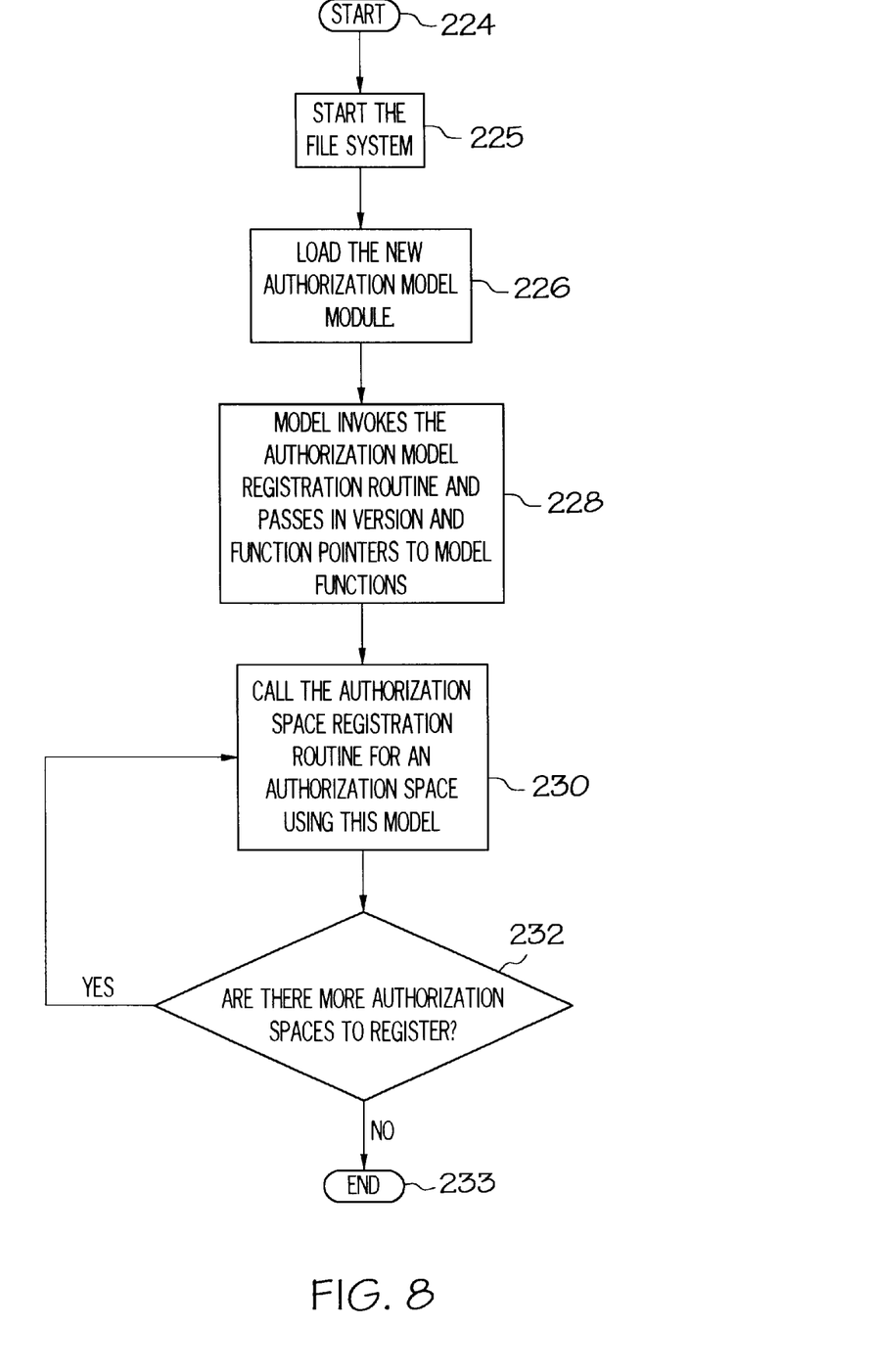
FIG. 8 is a flow diagram illustrating the registration of an authorization system according to one embodiment of this invention.

FIG. 8 is a flow diagram generally illustrating a registration process for authorization systems according to one embodiment of this invention. At block 225, the object system is initiated. At block 226, the operating system loads the authorization model associated with a particular volume. The object system can determine which authorization model to initiate in any of several ways. For example, startup data files can be used to maintain the names and locations of authorization systems which the object system will initiate as needed. New authorization systems can be identified to the object system through a console command. At block 228, the initiated authorization system invokes the authorization model registration routine of the object system. At block 230, an authorization space registration routine of the object system is invoked for each authorization space offered by this authorization system. At block 232, it is determined whether there are additional authorization spaces to register. If not, at block 233 the registration process for this authorization system ends. If there are additional authorization spaces registered for use with this model, then at block 230, the authorization space registration routine of the object system is again invoked to register the particular authorization space.

Figure 9:
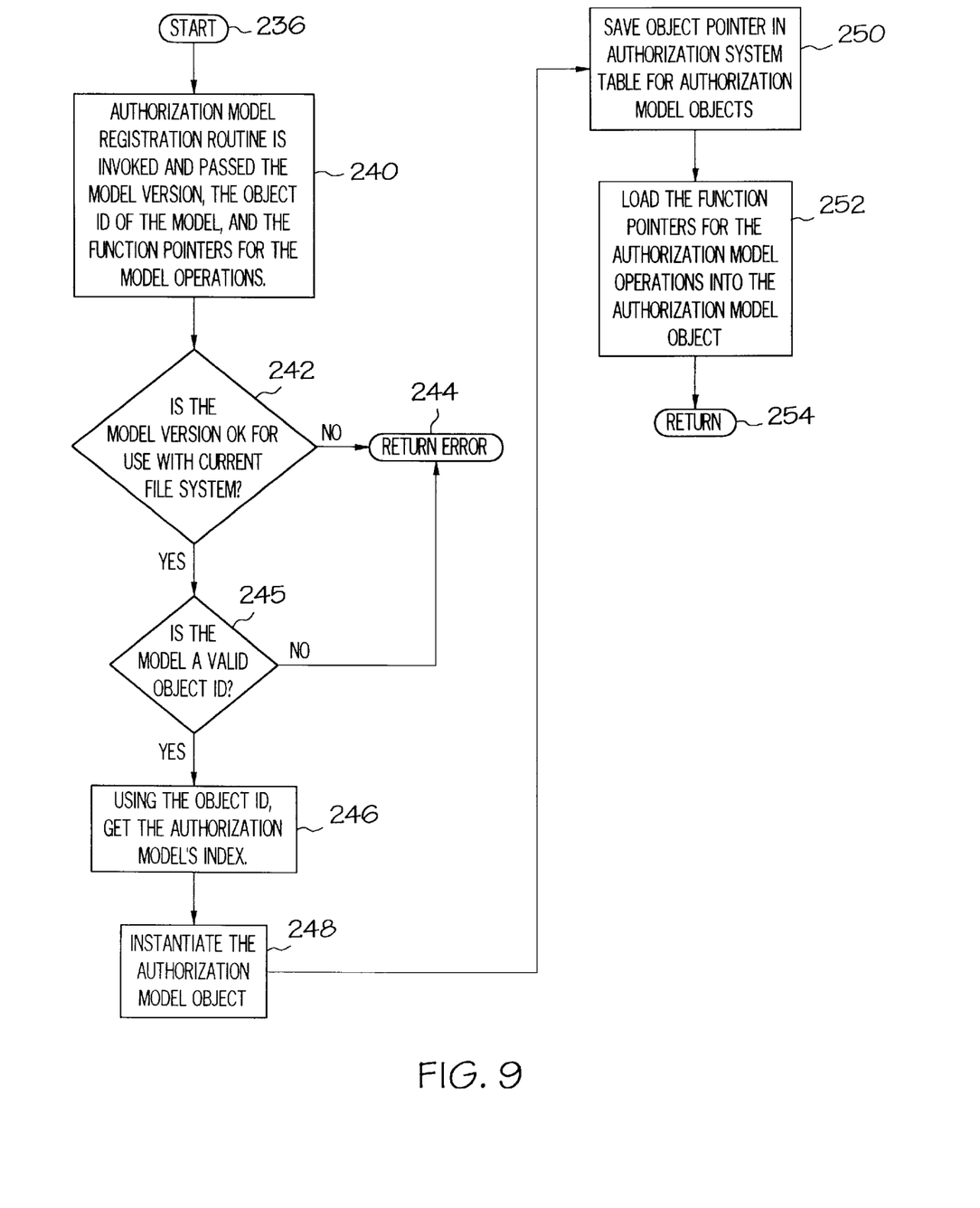
FIG. 9 is a flow diagram illustrating the registration of an authorization model according to one embodiment of this invention.

FIG. 9 is a flow diagram illustrating in more detail one process for registering an authorization model. As discussed with respect to FIG. 8, when the authorization model is invoked by the object system, the authorization model passes to the object system function pointers to the predetermined functions required by the object system, the objectID of the authorization model, and the model version. The objectID can be used to ensure that the authorization model is itself authorized to be loaded with the particular object system. By providing confidential objectIDs to legitimate developers of authorization systems, unauthorized authorization systems can be inhibited from successfully registering with the object system. The model version can be used to ensure that the predetermined interface between the object system and the authorization system is the same. The authorization model registration routine of the object system determines whether the model version is OK for use with the current object system. If not, at block 244 an error is returned. At block 245 it is similarly determined if the objectID is legitimate. If not, at block 244 in error is returned. If the versions and objectID are correct, at block 246 an index for loading a reference to the authorization model's structure (model 194 of FIG. 7, for example) in the authorization system table (authorization system table 188 of FIG. 7) is obtained. At block 248, an object or structure associated with that particular authorization model is created (model 194 of FIG. 7). At block 250, the reference to the authorization model object or structure is saved in the authorization system table. At block 252, the function pointers passed in by the authorization model are loaded into the authorization model object. (See FIG. 7, model 194). At block 254, the authorization model registration routine returns to the object system.

Figure 10:
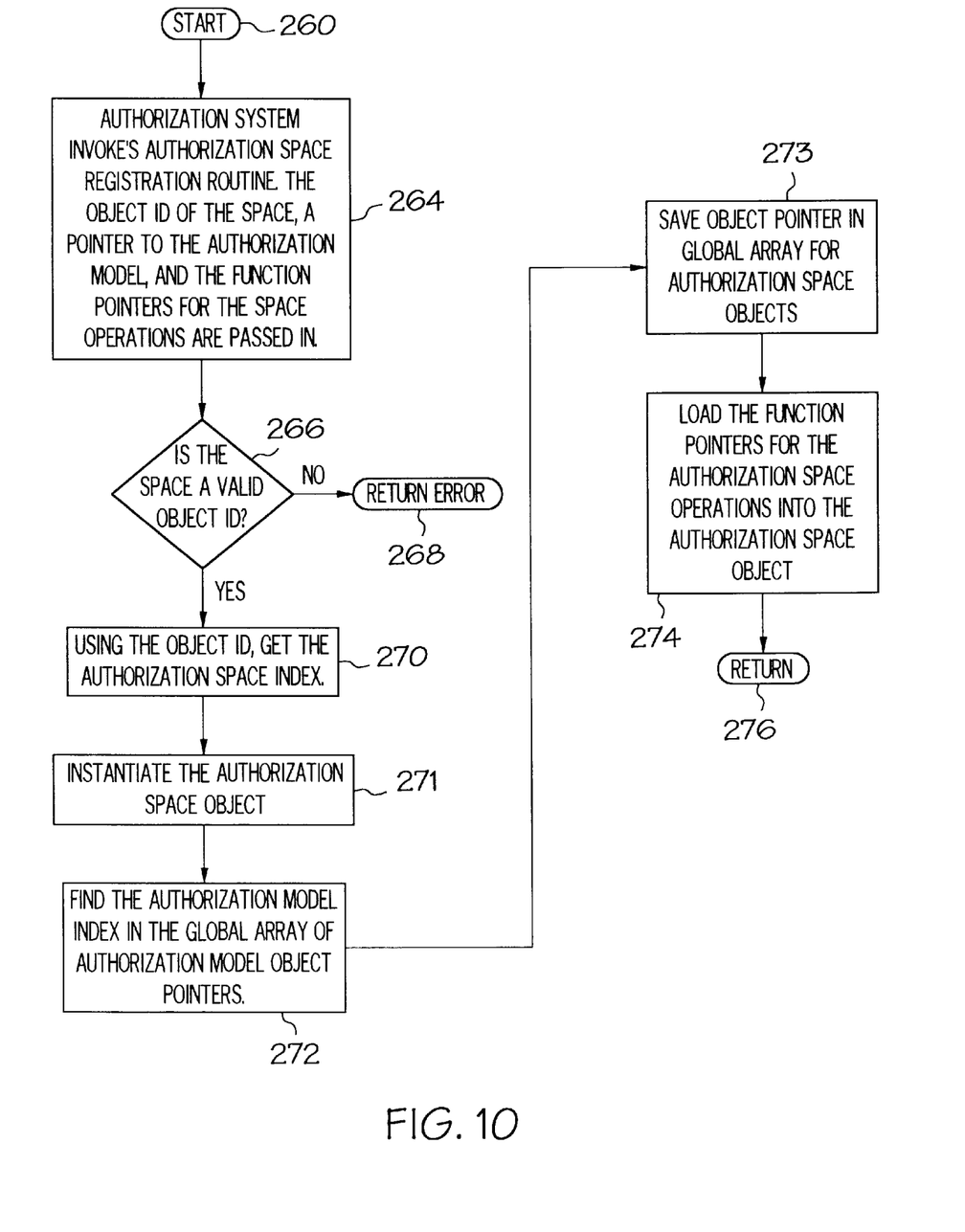
FIG. 10 is a flow diagram illustrating the registration of a plurality of authorization spaces according to one embodiment of this invention.

FIG. 10 illustrates in more detail a process for registering authorization spaces according to one embodiment of this invention. At block 264 the authorization system invokes the authorization space registration routine. The authorization system passes in function pointers to the space functions offered by the authorization space, the objectID of the space, and a pointer to the authorization model associated with the authorization space. At block 266, it is determined whether the objectID is valid. If not, at block 268 the space registration routine ends. At block 270, an index into a global authorization space table (not shown in FIG. 7, but similar to authorization system table 188 used to maintain references to authorization model structures) is obtained. At block 271 an authorization space object or structure is created. (See FIG. 7, authorization space object 210). At block 272 the index of the authorization model in the authorization model table for this authorization space (see FIG. 7, authorization system table 188) is obtained. At block 273, a reference to the authorization space (authorization space object 210 of FIG. 7) is made in both the global authorization space table (not shown), and in the authorization space table (see authorization space table 203 of FIG. 7) of the model associated with this authorization space. At block 274 the function pointers associated with the particular authorization space operations are loaded into the authorization space object. (See FIG. 7, authorization space object 210). At block 277, the authorization space registration routine returns.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. An object system, comprising:
    an object system capable of interacting with a plurality of different authorization systems, said object system being capable of generating an object upon request;
    an object adapted for association with one of the plurality of different authorization systems and having an authorization structure associated therewith, the authorization structure being definable by one of the plurality of different authorization systems; and
    the object system being operative to interact with the one of the plurality of different authorization systems with which the object is associated to obtain authorization information relating to the object.

2. A computer-implemented system according to claim 1, wherein the object system is capable of interacting with the plurality of different authorization systems via a predetermined authorization system interface.

3. A computer-implemented system according to claim 2, further comprising an authorization system, an authorization system structure, and an authorization system reference table, an entry in the authorization system reference table comprising a reference to the authorization system structure.

4. A computer-implemented system according to claim 3, wherein the authorization system structure comprises a plurality of references to authorization system routines for carrying out the authorization functionality provided by the authorization system.

5. A computer-implemented system according to claim 4, wherein the predetermined authorization system interface comprises the authorization system routines having a predetermined format.

6. A computer-implemented system according to claim 4, further comprising a reference associated with each of the plurality of objects, each reference operative to refer to a respective authorization system structure associated with the authorization structure of the respective object.

7. A computer-implemented system according to claim 2, wherein the authorization system interface comprises an authorization model interface operative to interface with an authorization model of an authorization system.

8. A computer-implemented system according to claim 7, wherein the authorization model interface comprises an authorization model object, and the authorization model object is operative to maintain a plurality of model pointers, each model pointer referencing a corresponding model routine of a particular authorization model.

9. A computer-implemented system according to claim 8, further comprising an authorization system having an authorization model, the authorization model operative to manipulate the authorization structure associated with the at least one object.

10. A computer-implemented system according to claim 9, further comprising an authorization space, the authorization space operative to maintain authorization information in the authorization structure.

11. A computer-implemented system according to claim 10, further comprising a plurality of authorization spaces, each authorization space having a predetermined format, and a director operative to receive an object access request and operative to communicate the object access request to the authorization space associated with the authorization model defining the authorization structure of the object.

12. A computer-implemented system according to claim 7, further comprising the authorization system having a plurality of authorization spaces, each authorization space operative to receive an object maintenance request, and the authorization system interface operative to select a particular authorization space as a function of the object maintenance request.

13. An object system, comprising:
    a plurality of objects;
    an authorization identifier operative to associate each object with one of a plurality of different object authorization systems;
    an authorization structure associated with each object, the authorization structure having a data layout definable by the one of the plurality of different object authorization systems with which the object is associated, the authorization structure being operative to contain authorization information associated with the respective object; and
    an authorization director operative to receive an object access signal to access an object, to determine the object authorization system associated with the object, and to direct the object access signal to the object authorization system associated with the object.

14. An object system according to claim 13, wherein the object further comprises an authorization reference to an authorization system function of the authorization system associated with the object.

15. An object system according to claim 14, wherein the authorization director directs the object access signal to the authorization system via the authorization reference.

16. A method for an object system to interact with a plurality of different object authorization systems, comprising:
    initiating an identified object authorization system;
    storing an authorization system reference to the object authorization system into an authorization system structure adapted to maintain authorization system references to a plurality of different object authorization systems;

associating an object authorization system with an object having an authorization structure;

receiving an object access signal to access an object;

determining which object authorization system is associated with the object; and communicating the object access request to the object authorization system associated with the object.

17. A method for an object system to interact with a plurality of object authorization systems according to claim 16, further comprising creating an authorization system object, and loading into the authorization object at least one function reference referring to a function provided by the identified object authorization system.

18. A method for an object system to interact with a plurality of object authorization systems according to claim 16, wherein the communicating step comprises passing the object access request to the function referred to by the at least one function reference.

19. A method for an object system to interact with a plurality of object authorization systems according to claim 16, wherein the object authorization system comprises an authorization model and at least one authorization space, and further comprising communicating the object access signal to one of the authorization model and the authorization space as a function of the object access request.

20. A method for an object system to interact with a plurality of object authorization systems according to claim 16, further comprising the authorization system accessing the authorization structure associated with the object, and returning a status as a function of the access.

* * * * *